(12) United States Patent
Sung et al.

(10) Patent No.: US 7,693,533 B2
(45) Date of Patent: Apr. 6, 2010

(54) METHOD AND SYSTEM FOR MERGING MULTIPLE PUSH-TO-TALK OVER CELLULAR SESSIONS

(75) Inventors: Sang-Kyung Sung, Seoul (KR); Joon-Goo Park, Yongin-si (KR); Sung-Jin Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 861 days.

(21) Appl. No.: 11/190,545

(22) Filed: Jul. 27, 2005

(65) Prior Publication Data

US 2006/0035656 A1 Feb. 16, 2006

(30) Foreign Application Priority Data

Jul. 30, 2004 (KR) .................. 10-2004-0060592

(51) Int. Cl.
*H04B 7/00* (2006.01)
*H04Q 7/20* (2006.01)

(52) U.S. Cl. .................. 455/518; 455/416; 455/519; 370/260

(58) Field of Classification Search .............. 455/3.05, 455/458, 445, 416, 463, 516–519; 370/352, 370/354, 373, 377, 384, 385, 522, 524, 401, 370/341, 468, 335, 260, 329, 342; 379/229, 379/221.08, 221.09, 221.1, 221.12
See application file for complete search history.

(56) References Cited

U.S. PATENT DOCUMENTS 5,809,018 A 9/1998 Lehmusto

| | | | |
|---|---|---|---|
| 5,930,723 A | 7/1999 | Heiskari et al. | |
| 6,477,150 B1 | 11/2002 | Maggenti et al. | |
| 7,283,489 B2 * | 10/2007 | Palaez et al. | 370/277 |
| 2002/0033880 A1 * | 3/2002 | Sul et al. | 348/14.09 |
| 2002/0077136 A1 | 6/2002 | Maggenti et al. | |
| 2003/0016632 A1 * | 1/2003 | Refai et al. | 370/260 |
| 2003/0153343 A1 | 8/2003 | Crockett et al. | |

(Continued)

FOREIGN PATENT DOCUMENTS

GB 2 290 196 12/1995

(Continued)

*Primary Examiner*—Sujatha Sharma
(74) *Attorney, Agent, or Firm*—The Farrell Law Firm, LLP

(57) ABSTRACT

A method for performing session merging between PoC sessions under the environment of multiple PoC sessions is provided. A merging PoC client sends a request for the session merging with a merged session to a PoC server managing a merging session to which the PoC client belongs. The PoC server managing the merging session sends a session merge request to a PoC server managing the merged session. Negotiation of a CF (Controlling PoC Function) for managing a session to be merged is performed between the PoC server of the merging session and the PoC server of the merged session. When an entire CF of the session to be merged is selected as the negotiation between the PoC servers is completed, the PoC server of the merged session sends an UPDATE message of modified media parameters to a PoC client of the merged session. The PoC server of the merging session sends, to a PoC client of the merging session, a NOTIFY message of a merge request notifying that the PoC server of the merging session is selected as the entire CF.

27 Claims, 9 Drawing Sheets

U.S. PATENT DOCUMENTS

| | | | |
|---|---|---|---|
| 2004/0057412 A1* | 3/2004 | Curcio et al. | 370/341 |
| 2004/0076145 A1* | 4/2004 | Kauhanen et al. | 370/352 |
| 2006/0080344 A1* | 4/2006 | McKibben et al. | 707/100 |
| 2006/0120308 A1* | 6/2006 | Forbes et al. | 370/260 |
| 2007/0153777 A1* | 7/2007 | Coulas et al. | 370/356 |
| 2007/0218924 A1* | 9/2007 | Burman et al. | 455/466 |
| 2008/0031227 A1* | 2/2008 | Wang | 370/352 |

FOREIGN PATENT DOCUMENTS

| | | |
|---|---|---|
| KR | 1020050060805 | 6/2005 |
| WO | WO 96/20573 | 7/1996 |
| WO | WO 02/084895 | 10/2002 |
| WO | WO 02/085051 | 10/2002 |
| WO | WO 03/053004 | 6/2003 |

\* cited by examiner

FIG. 6

```
MESSAGE sip:client_x@domain.com SIP/2.0
Via: SIP/2.0/TCP client_ypc.domain.com;branch=z9hG4bK776sgdkse
Max-Forwards: 70
From: sip:client_y@domain.com;tag=49583
To: sip:client_x@domain.com
Call-ID: asd88asd77a@1.2.3.4
CSeq: 1 MESSAGE
Content-Type: text/plain
Content-Length: 40
```
} HEADER BODY  Hi colleagues, our group name is PAG-WG. ← GROUP DISPLAY NAME

METHOD AND SYSTEM FOR MERGING MULTIPLE PUSH-TO-TALK OVER CELLULAR SESSIONS

PRIORITY

This application claims priority to an application entitled METHOD AND SYSTEM FOR MERGING MULTIPLE PUSH-TO-TALK OVER CELLULAR SESSIONS, filed in the Korean Intellectual Property Office on Jul. 30, 2004 and there duly assigned Serial No. 2004-60592, the contents of which are incorporated herein by reference.

BACKGROUND OF THE INVENTION

1. Field of the Invention

The present invention relates generally to a method and system for merging multiple push-to-talk over cellular (PoC) sessions which, when group members belonging to one PoC group session want to participate in another PoC session under the environment of multiple PoC group sessions, establishes a new session by merging PoC group sessions without releasing the currently participating PoC session.

2. Description of the Related Art

With recent developments in mobile communication technology as well as expansion of communication networks, service and applications using a mobile phone are now more diversified and expansive. Further, user demand has been extended from simple communication service toward location service, multimedia service, PTT (Push-to-Talk) service, and so forth. In particular, the PTT service supports various additional functions, such as an instant messenger, a status indication, etc, inclusive of group communication and voice communication which was possible only with a radio set, a TRS (Trunked Radio System), etc., in the past.

Currently, there is a lively discussion to enact a standard of PTT over Cellular (PoC) service that serves a concept of the PTT using a mobile communication network. The PoC service has various features distinguished from the existing mobile communication service. One of the features allows a user to, because he/she belongs to a plurality of sessions, make a call while moving between the sessions if necessary. The requirement that the user should be allowed to make the call while moving between the plurality of sessions is specified in requirements of an OMA (Open Mobile Alliance), which is a group that defines mobile communication services.

Hereinafter, a structure of a general PoC service system will be described.

FIG. 1 is a conceptual view showing a general PoC basic structure. Referring to FIG. 1, a PoC client 10 is a service requester that is mounted in a mobile phone, and usually connected to a network based on a SIP/IP (Session Initiation Protocol/Internet Protocol) core 30 through an access network 20, wherein the SIP/IP core-based network is a core network for supporting SIP and IP multimedia.

Here, the PoC client 10 makes it possible to provide access to PoC service while residing in a PoC user terminal. The PoC client 10 has main functions such as originating a PoC session, participating in an existing PoC session, and terminating the established PoC session, in the aspect of a PoC user. In addition, the PoC client 10 performs other functions such as creating and sending a talk burst, supporting an instant personal alert, and providing authentication when getting access to the PoC service. Hereinafter, as long as a separate reference is not required, the term "PoC client 10" is used in the same meaning as a PoC service subscriber.

The SIP/IP core-based network is connected to a PoC server 60, a GLMS (Group List Management System) 50 and a presence server 70 in order to support the PoC service, thereby providing the PoC service. The PoC server 60 performs a Controlling PoC Function (hereinafter, referred to as "CF") for maintaining and managing the PoC session, a Participating PoC Function (hereinafter, referred to as "PF") for participating in the PoC session opened for one-to-one communication or many-to-many communication, and so forth.

Hereinafter, the CF and the PF functions will be described in more detail with reference to the following Tables 1 and 2, respectively.

TABLE 1

Controlling PoC Function (CF)

Provides centralized PoC session handling
Provides the centralized Media distribution
Provides the centralized Talk Burst Arbitration functionality including
    talker identification
Provides SIP session handling, such as SIP session origination,
    termination, etc.
Provides policy enforcement for participation in group sessions
Provides the participants information
Collects and provides centralized media quality information
Provides centralized charging reports
May provide transcoding between different codecs
Support Talk Burst Control Protocol Negotiation As shown in Table 1, the CF function performs, among functions of the PoC server, a function that serves to manage the PoC sessions on the whole, particularly to receive, sequence and authorize the right-to-speak (or floor) request of the PoC clients, to distribute a talk burst requested by an arbitrary PoC client to all the other PoC clients participating in group calling, and to provide information of the PoC clients participating in the group calling.

As shown in Table 2, the PF function serves to manage the sessions that are connected with the CF and the respective PoC clients in the PoC session. In particular, the PF function serves to relay the right-to-speak when the PoC client requests the right-to-speak or when the right-to-speak is assigned to the PoC client in the CF function. Further, the PF function serves to relay media between the CF function and the PoC client, to perform transcoding when different codecs are used between the CF function and the PoC client, and to filter any one of two simultaneous sessions according to selection of a PoC user when the PoC user is invited to one session while participating in the other session.

TABLE 2

Participating PoC Function (PF)

Provides PoC session handling
May provide the Media relay function between PoC client and Controlling
    PoC server
May provide user media adaptation procedures
May provide the Talk Burst control message relay function between PoC
    client and Controlling PoC server
Provides SIP session handling, such as SIP session origination, termination
    etc., on behalf of the represented PoC client.
Provides policy enforcement for incoming PoC session (e.g. access
    control, incoming PoC session barring, availability status, etc)
May collect and provide media quality information
Provides the participant charging reports
May provide filtering of the media streams in the case of simultaneous
    sessions
May provide transcoding between different codecs
May support Talk Burst Control Protocol Negotiation
Stores the current Answer Mode and Incoming PoC Session Barring
    preferences of the PoC client Meanwhile, in order to open the many-to-many session, the PoC service system requires management of PoC participation groups intended for participation and management of a list of the PoC participation groups, and includes a server for the GLMS 50 which provides the PoC participation groups and their list, and a GLMS manager or administrator 40 that performs management of the GLMS server.

Further, the PoC service system includes the presence server 70 that provides and manages information on an individual or group to whom the PoC service is provided. Finally, the PoC service system should include a remote PoC network 80 that represents the SIP/IP core-based network, the PoC server, etc. for connection with another user when communication between individuals or between the individual and the group is performed in the PoC service.

In the PoC system configured as mentioned above, a certain PoC user can input information on the group and its members into the GLMS 50 by means of his/her own terminal, and can know information of other PoC users who can be called out through an individual or group list received from the GLMS 50. Another method capable of generating, correcting and managing the group and its members in the GLMS 50 can input such information through a communication network, such as an Internet, an intranet.

In order to make use of PoC calling service, the PoC user registers his/her PoC address with the SIP/IP. At this time, the SIP/IP core 30 stores information on the PoC user on the basis of a request of the PoC user. Therefore, when attempting PoC group calling, another PoC user registers his/her own information with the SIP/IP core-based network in advance as set forth above, and sends a calling request to his/her own SIP/IP core-based network using group identification information received from the GLMS 50. At this time, the SIP/IP core 30 performs address resolution and domain location resolution using the information of the requesting PoC user, and then sends a PoC communication request to a home PoC server with which the requesting PoC user is registered. The PoC server prepares the establishment of the PoC session in response to the PoC communication request, obtains information of each PoC user from a GLMS server, and sends a communication request signal to the corresponding SIP/IP core-based network. At this time, in the case of the communication requests of the users within an intra-domain, the PoC server performs the functions of both the PF and the CF. The PoC server managing the PoC user who receives the communication request locates the SIP/IP core-based network using the information of the PoC user which is sent to the PoC server, and then sends the communication request to the PoC user.

Hereinafter, a general PoC communication procedure having the above-mentioned features will be described with reference to FIG. 2, which is a flowchart showing a procedure of establishing a general PoC session.

Referring to FIG. 2, a PoC client A sends information on an individual or group, with whom the PoC client A wants to talk, to a SIP/IP core A through an INVITE message. The SIP/IP core A checks a parameter designating PoC service from the information of the INVITE message, and sends an INVITE request to a PoC server A which takes charge of the PoC client A. The PoC server A has a difference in realizing functions of a home PoC server according to a type of a PoC call. In other words, when directly establishing the PoC session, like a one-to-one or ad-hoc group call, the PoC server A is so realized that its own home PoC server performs the PF and CF functions at the same time, and sends the INVITE message to a PoC server B which takes charge of a PoC client B. In the case of a pre-arranged group call, in which clients participate in a previously originated session, a management function of the session cannot be realized in the home PoC server, and thus the INVITE message is sent to the PoC server A that performs the CF function on the session. At this time, the SIP/IP core serves as a passage through which the INVITE message is transmitted as mentioned above, and actually serves to perform address resolution of the PoC server B or PoC server A. When the INVITE message transmitted in this manner is transmitted to a PoC client B, the PoC client B sends an alerting response (e.g., ringing, light, beep etc.) to the PoC client A. When a PoC user B receives a PoC call, an OK response is transmitted to the PoC client A, so that the PoC call is connected. Next, the PoC client A receives a floor (right-to-speak) from a server performing the CF function, and thereby PoC communication is ultimately performed.

The prior art for the PoC service assists the PoC user in participating in one or more PoC sessions. When one group session desires a group communication with group members of another PoC session, group members of the PoC session which wants to be merged with another PoC session each send a session termination message to the session to which each member belongs, and then participate in the group communication by request of new session participation in a session in which each member wants to participate. Further, this procedure is applied to all of the members, each of whom wants to participate in the session. At this time, the session which originally wants to be merged is terminated.

Hereinafter, a conventional PoC communication procedure for connecting with another PoC session will be described with reference to the FIG. 3, which is a flowchart showing a method of merging with another PoC session.

Referring to FIG. 3, a PoC session Y is one group session that wants to be merged, and a PoC session X is a group session that requests session merging. In the prior art, in order to be merged with a previously activated session, the PoC session X first sends a termination signal (PoC Session Bye) to a PoC server X that manages a currently ongoing session. In this process, the PoC session X causes a media parameter, which is reciprocally negotiated between a server and a client, to be released. Subsequently, after termination of an existing session, a PoC client makes a new INVITE request. Here, the PoC client X requires an identity of a group session that wants new participation (to be merged) so as to determine a server intended to send the INVITE request. To this end, the PoC client X makes use of address information such as a conference URI (Uniform Resource Identifier).

Finally, after receiving a session participation request from the PoC client X, a PoC server Y sends an OK message to the PoC client X, which requested the PoC session, by means of policy within the PoC server or approval of group members in response to the session participation request. Thereby, the merged session managed by the PoC server Y is configured, and a Talk Burst Control procedure for arbitrating the right to speak in the PoC communication is performed.

Hereinafter, the session which wants to merge (in FIG. 3, the PoC session X) is called a merging session, while the session to be merged (in FIG. 3, the PoC session Y) is called a merged session. Further, among the functions of the PoC server, the controlling PoC function is abbreviated as CF, and the participating PoC function is abbreviated as PF.

In the prior art as mentioned above, when the group members belonging to an arbitrary PoC group session want to participate in another PoC session under the environment of the multiple PoC group sessions, it is not until the currently participating PoC session is released that the group members establish the session with another group.

SUMMARY OF THE INVENTION

It is, therefore, an object of the present invention to provide a method and system for merging multiple PoC sessions, in which, when group members belonging to one PoC group session want to participate in another PoC session under the environment of multiple PoC group sessions, the group members establish a new session by merging of PoC group sessions without releasing the currently participating PoC session.

In order to accomplish this objective, according to an aspect of the present invention, a method for merging multiple PoC sessions is provided. The method includes steps of sending, by a merging IP messaging client, a request for session merging with a merged session to a IP messaging server managing a merging session to which the IP messaging client belongs; sending, by the IP messaging server managing the merging session, a session merge request to a IP messaging server managing the merged session; performing negotiation of a CF (Controlling Function) for managing a session to be merged between the IP messaging server of the merging session and the IP messaging server of the merged session; when an entire CF of the session to be merged is selected as the negotiation between the IP messaging servers is completed, sending, by the IP messaging server of the merged session, an UPDATE message of modified media parameters to a IP messaging client of the merged session; and sending, by the IP messaging server of the merging session, to a IP messaging client of the merging session, a NOTIFY message of a merge request notifying that the IP messaging server of the merging session is selected as the entire CF.

According to another aspect of the present invention, a system for merging multiple PoC sessions is provided. The system includes at least one PoC client for requesting merger with another session; a PoC server of a merging session for receiving a request for session merging with a merged session from the merging client and for sending a session merge request to a PoC server managing the merged session; and a PoC server of the merged session for receiving the session merge request from the PoC server of the merging session, performing negotiation of a Controlling PoC Function (CF) intended to manage a session to be merged between the PoC servers, and sending an UPDATE message of modified media parameters to a PoC client of the merged session as the negotiation between the PoC servers is completed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 6 shows a format of an instant message including session information;

DETAILED DESCRIPTION OF THE PREFERRED EMBODIMENTS

Hereinafter, exemplary embodiments of the present invention will be described in detail with reference to the accompanying drawings.

To begin with, description will be made regarding the general states before and after two arbitrary group sessions of multiple PoC (Push-to-talk over Cellular) group sessions are merged.

Figure 1:
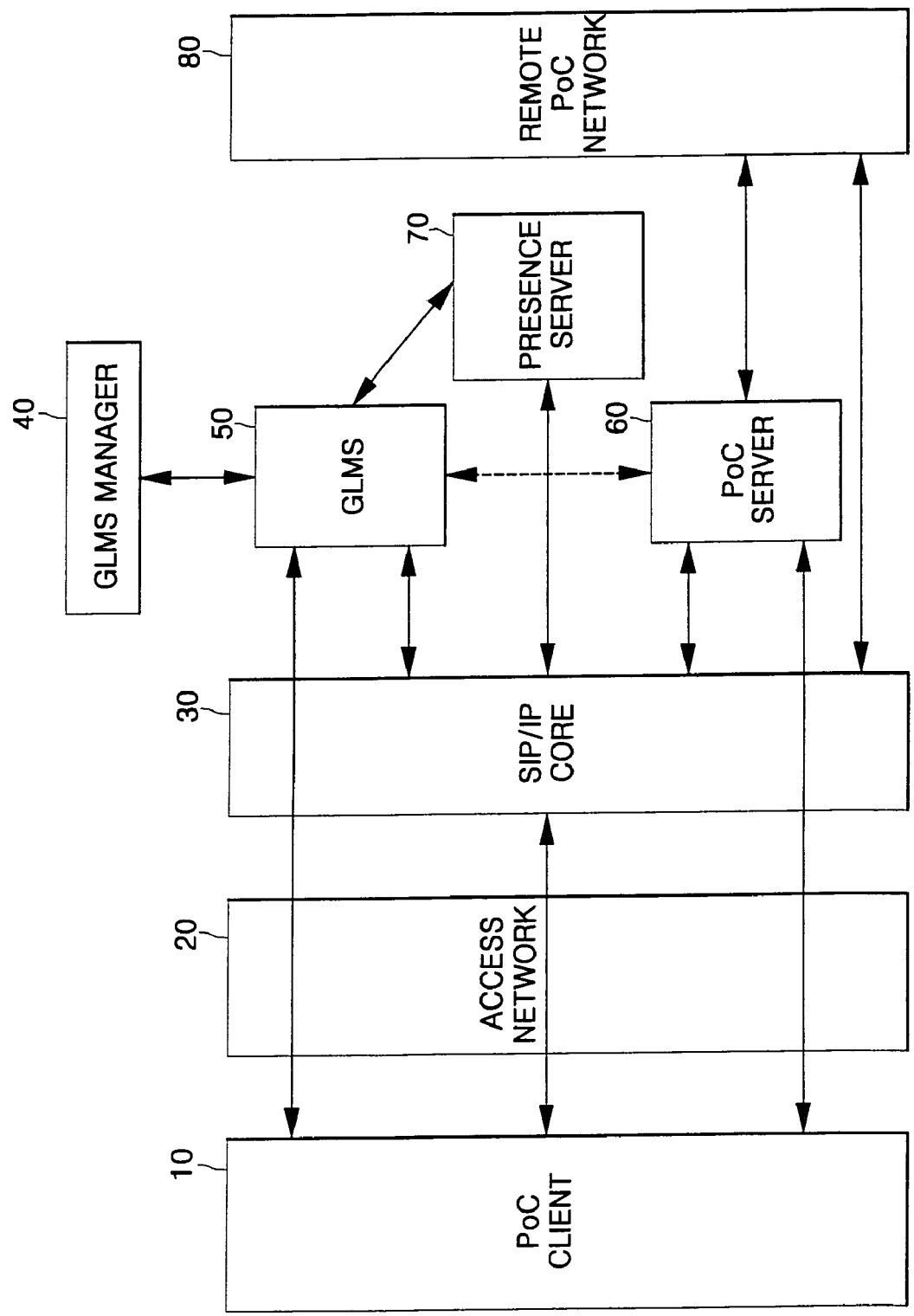
FIG. 1 is a conceptual view showing a general PoC basic structure.
Figure 2:
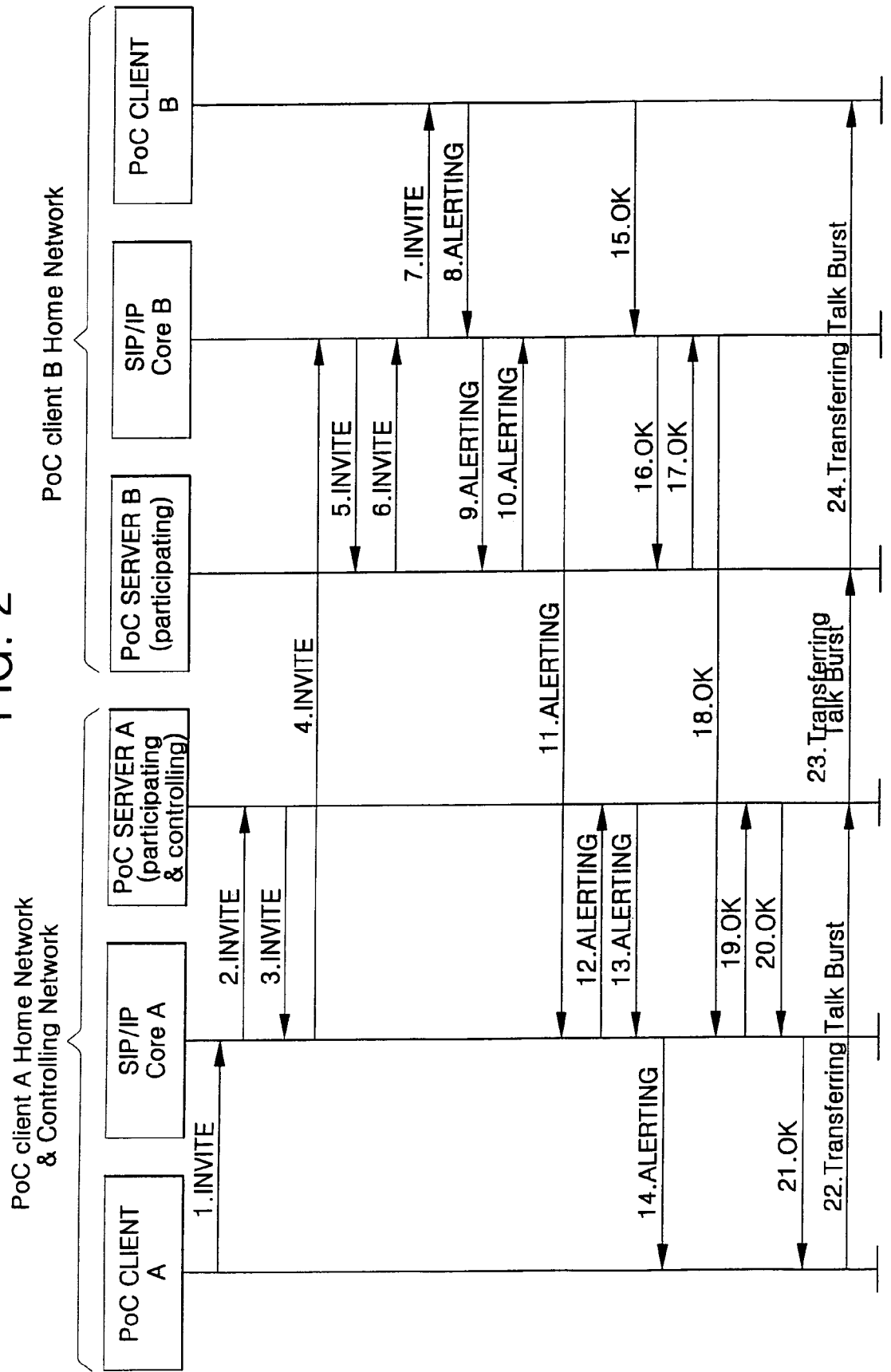
FIG. 2 is a flowchart showing a procedure of establishing a general PoC session.
Figure 3:
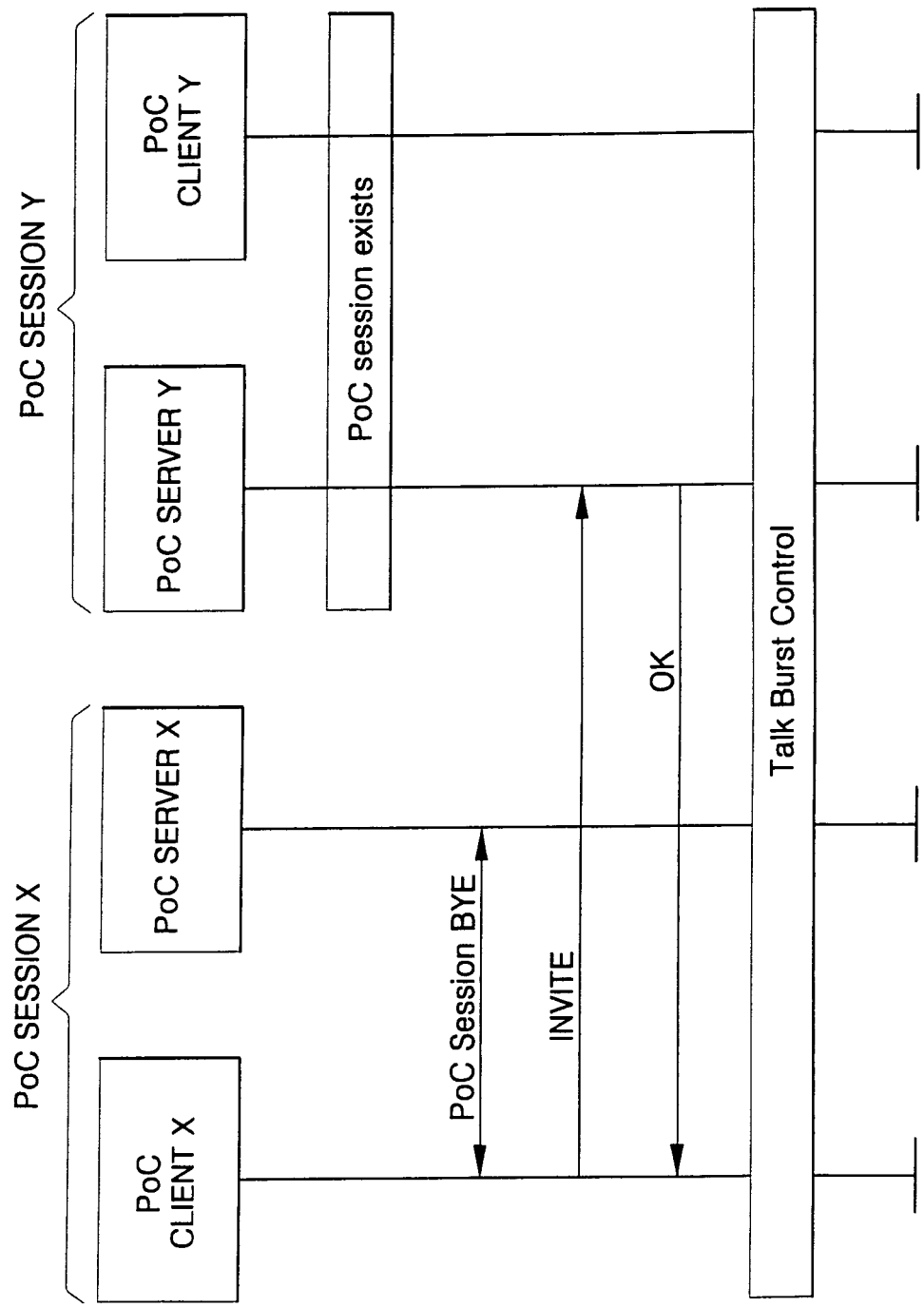
FIG. 3 is a flowchart showing a method of merging with another PoC session according to the prior art.
Figure 4A:
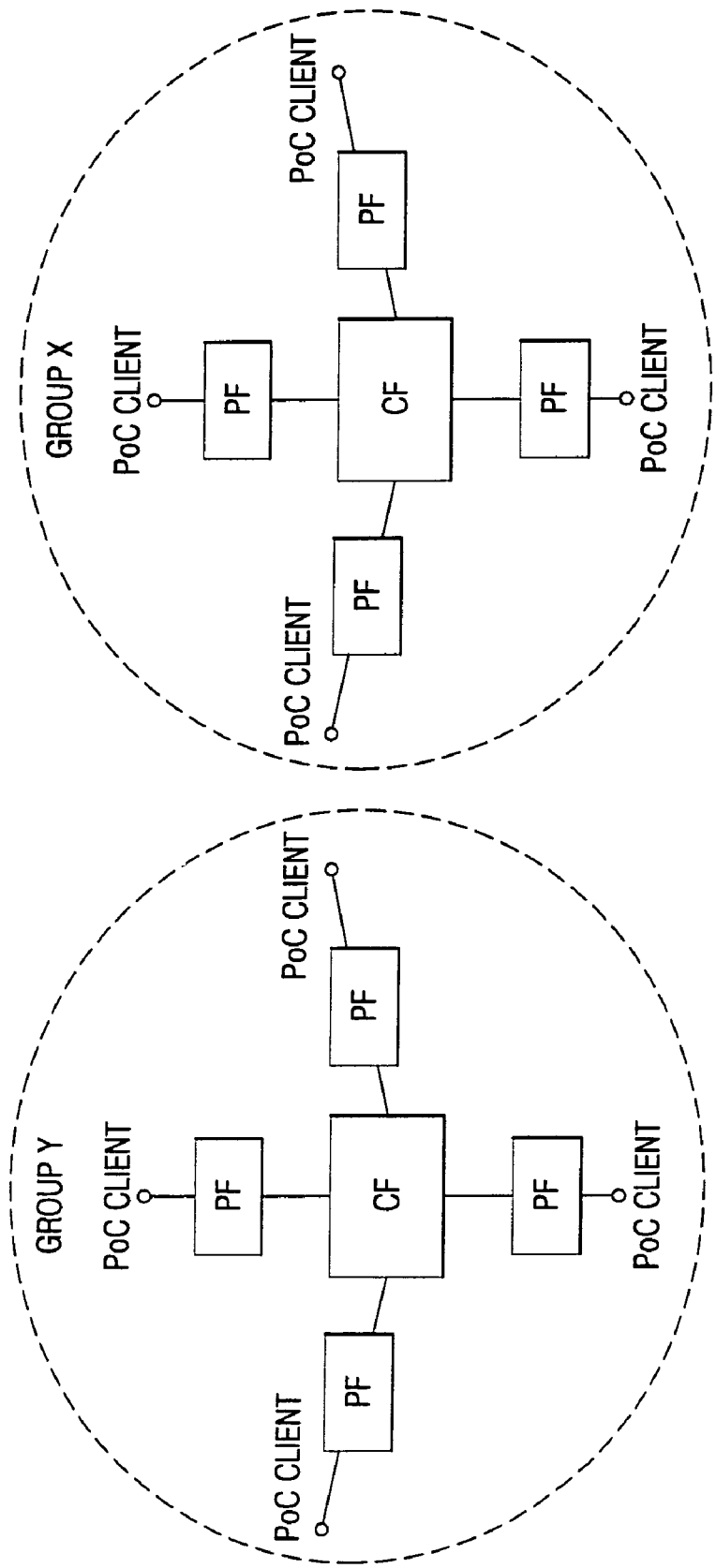
FIG. 4A is a schematic layout showing a state before two arbitrary group sessions are merged.
Figure 4B:
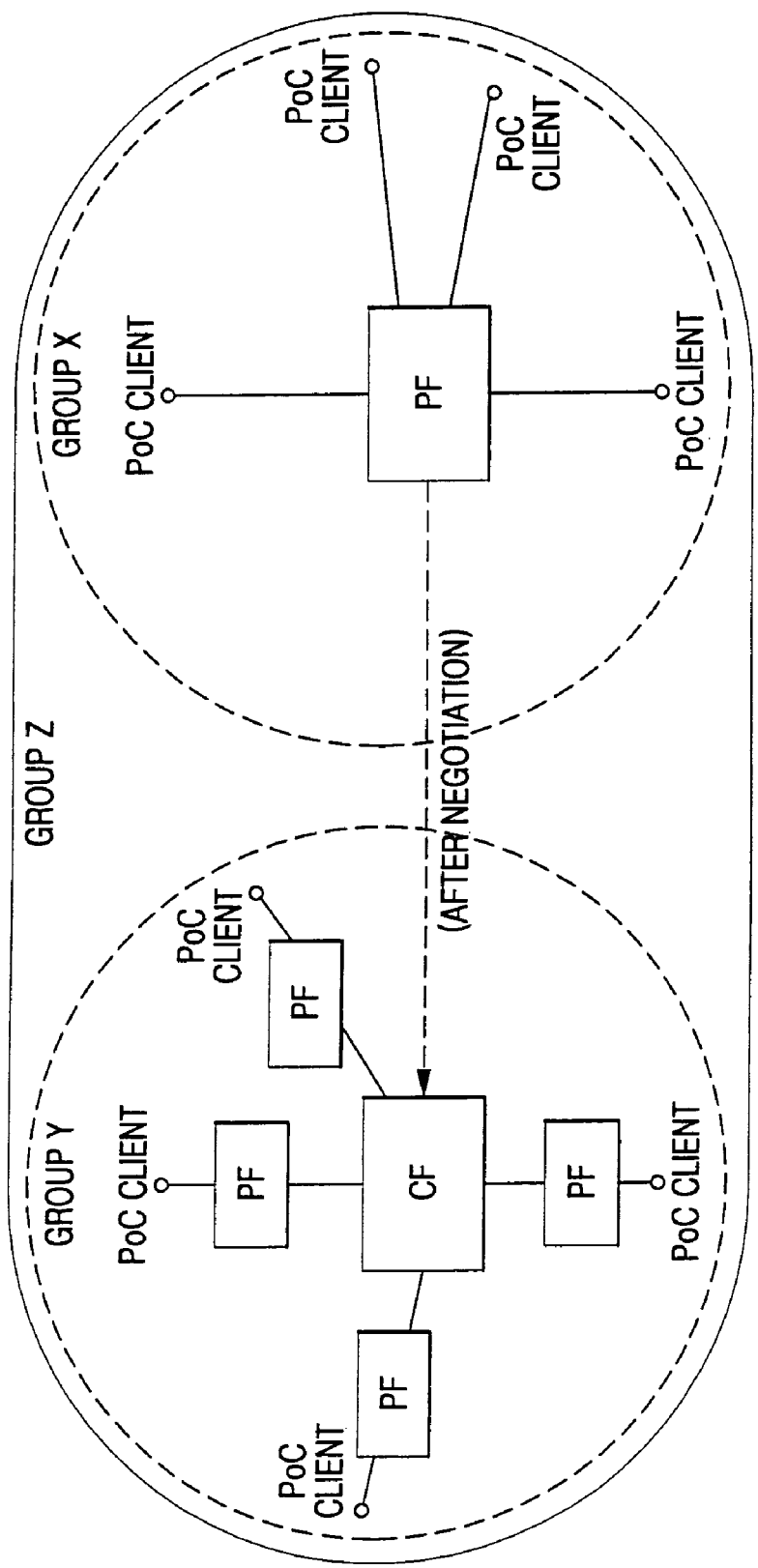
FIG. 4B is a schematic layout showing a state after two arbitrary group sessions are merged.

FIG. 4A is a schematic layout showing a state before two arbitrary group sessions are merged, and FIG. 4B is a schematic layout showing a state after two arbitrary group sessions are merged.

Referring to FIGS. 4A and 4B, in a state where members of two groups (group X, and group Y) each participate in different sessions, when the members of group X want to participate in a session of group Y, group X members originate a new session without releasing the current PoC session in which they participate by allowing a CF (Controlling PoC Function) of a PoC server of group Y to take charge of functions performed at a CF of a PoC server of group X.

In order to show a method where, when group members belonging to an arbitrary PoC group session (either group X or group Y) want to participate in another PoC session under the environment of multiple PoC group sessions, the group members establish a new session by merging PoC group sessions without releasing the current PoC session in which they participate, a merging session transmits session information to a merged session, and thereby the merged session obtains the session information on the merging session.

Thus, description will made first regarding a process where a client of the merging session transmits its own group identity to the merged session as well as information on the merging session in the PoC group sessions.

Figure 5:
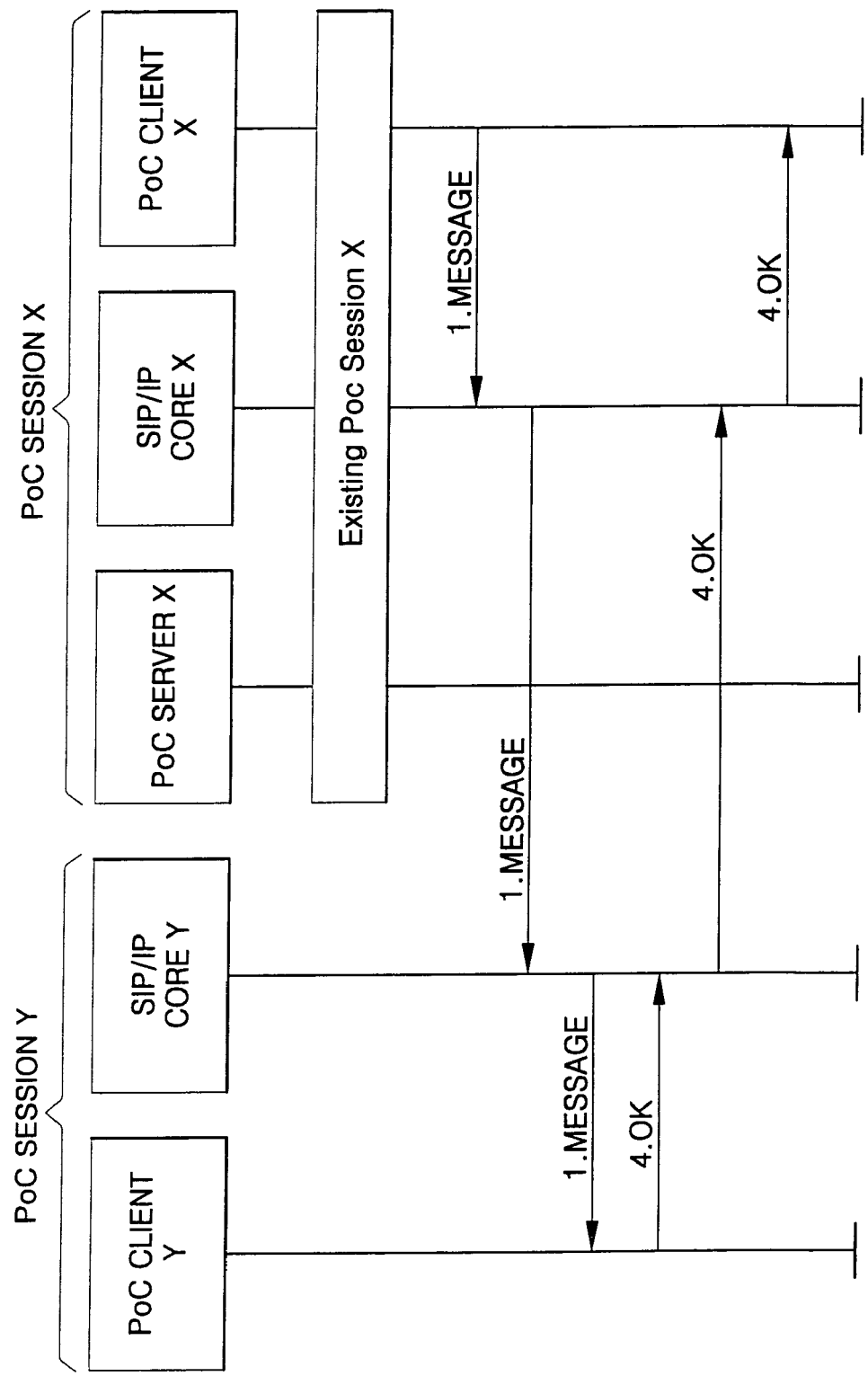
FIG. 5 is a flowchart showing a method of obtaining information on a merging session using instant messaging.

FIG. 5 is a flowchart showing a method of obtaining information on a merging session using instant messaging.

Referring to FIG. 5, a PoC client X existing in a PoC session X can transmit group identification information such as its own conference URI (Uniform Resource Identifier), wherein the group identification information is included in a body content of a MESSAGE request method. At this time, a client of a receiving PoC session Y can receive the group identification information of the PoC session X without a PoC server using a MESSAGE method separately from PoC communication.

Hereinafter, details of SIP (Session Initiation Protocol) will be described, when the PoC client X, the user of a session request group, sends its own group identity to the merged session through the MESSAGE method. As shown in FIG. 6, MESSAGE is divided into a header and body, the body of MESSAGE has a content in which a group display name of the merging session (in FIG. 6, PAG-WG) may be included.

As mentioned above, after the PoC session group identities, i.e. the session information, are obtained in the merged session, a process of practical session merging proceeds.

Figure 7:
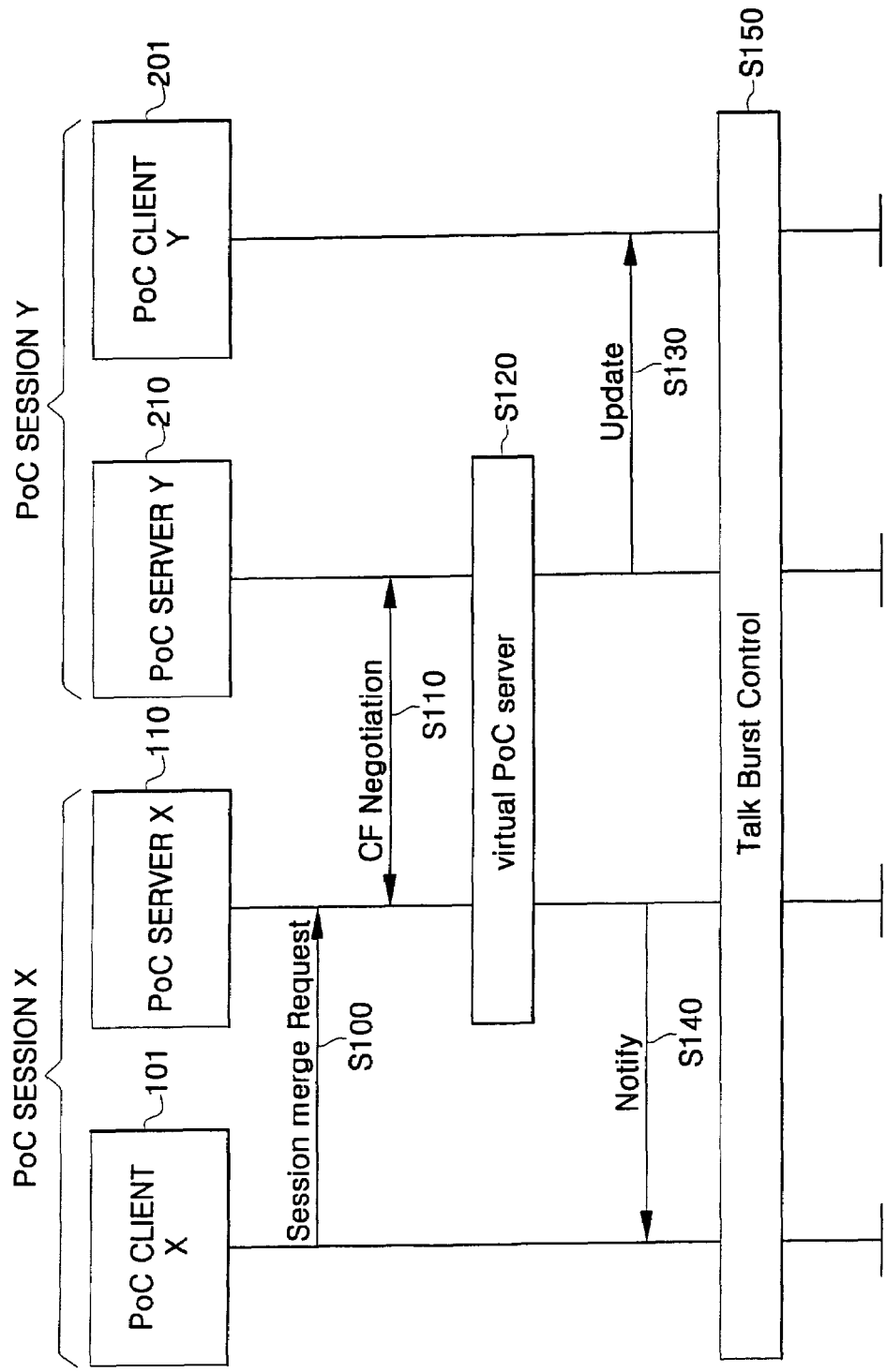
FIG. 7 is a schematic flowchart showing a session merging process for realizing the present invention.

FIG. 7 is a schematic flowchart of a session merging process for realizing the present invention.

First, a PoC client X, a merging session, requests a PoC server X for session merging with a merged session, wherein the PoC server X manages a session to which the PoC client X belongs (step S100). At this time, the PoC server X sends a session merge request to a PoC server Y in the same method as the above-stated instant messaging service using a group URI of the merging session, and opens CF negotiation for managing the merged session (step S110).

For the purpose of CF negotiation, the PoC server X sends a session merging indication, a media parameter, a session identity, a contact address, etc., of the session designated by the PoC server X, when the session merge request is sent.

Meanwhile, the PoC server Y of the merged session which receives the session merge request opens the session negotiation on the basis of the information sent with the session merge request. At this time, alternatively, on the basis of policy of a PoC session Y, the PoC server Y may open the session merge negotiation on behalf of the others, or proceed to session merging according to responses of all the clients within the PoC session Y.

When CF negotiation between the PoC servers is concluded, one of the existing PoC servers acts as a proxy server that performs the CF function on another PoC session, and the other substantially performs the PF function. In this manner, when the entire CF is selected for the sessions merged by the negotiation between the PoC servers (step S120), an UPDATE message for modified media parameters is sent to the PoC client Y of the merged session (step S130). Further, a NOTIFY message of the merge request is sent to the PoC client X of the merging session (step S140).

Hereinafter, an embodiment where SIP is used for the procedure for the session merging will be described with reference to FIG. 8, which is a flowchart of a session merging process based on SIP according to an embodiment of the present invention.

Figure 8:
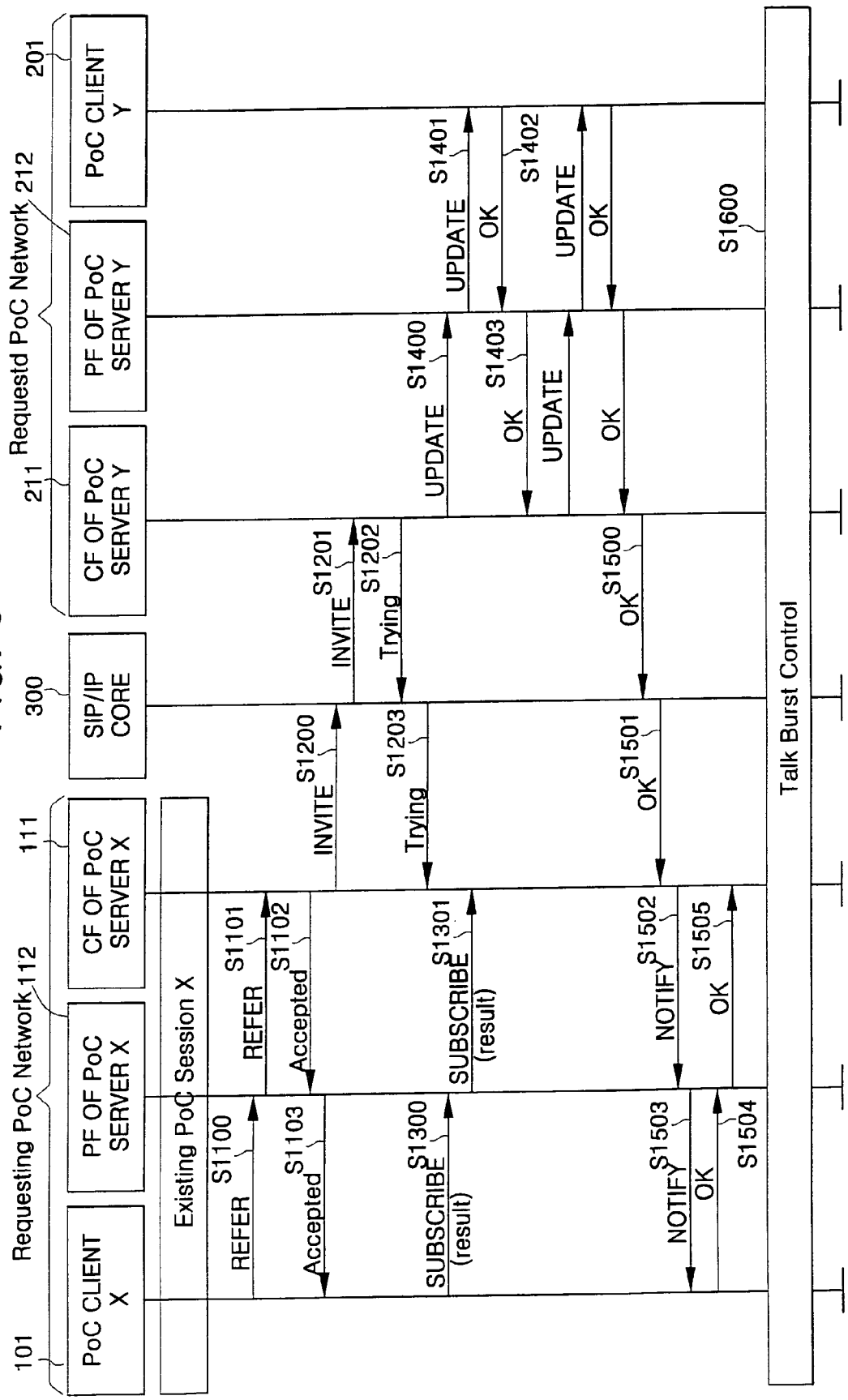
FIG. 8 is a flowchart showing a session merging process based on SIP according to an exemplary embodiment of the present invention.

Roughly speaking, FIG. 8 shows a procedure of, when a client of a merging session requests a PoC server for session merging using SIP, negotiating the session merging through signaling between servers, updating parameters of the session merging, and notifying users of each session of the updating.

First, a PoC client X 101 of a merging session sends a REFER request to CF 111 and PF 112 of a PoC server X using its own PoC address and an identity of a merged group session, wherein the PoC client X 101 belongs to the CF 111 and PF 112 (steps S1100 and S1101). Here, the REFER request is sent to the CF 111 of the PoC server X through a procedure of performing address resolution in a SIP/IP core based network connecting the PoC server X, and then an ACCEPTED message makes a response (steps S1102 and S1103).

When the sessions are merged, the response may be made after it is determined if authorization is granted to a merging user. In this case, an OK message may be sent.

Next, the CF 111 of the PoC server X managing the merging session sends a PoC session merging indication, media parameters determined at the PoC server X, etc., using a sent group indication of the merged session (steps S1200 and S1201).

A CF 211 of a PoC server Y receiving an INVITE request sends a temporal response, TRYING (steps S1202 and S1203), and then undergoes proper session internal procedures (steps S1400, S1401, S1402, and S1403). Thereafter, when the merged session completes preparation for the session merging, an OK response to the session merging is sent (steps S1500 and S1501).

When the INVITE request is received, CF 211 and PF 212 of the PoC server Y perform the session merging procedure using the sent media parameters and session merging indication, sends an UPDATE request for negotiated media parameters to all the clients within the merged session, and receives an OK response (steps S1400, S1401, S1402 and S1403).

When responses to all the media parameters are received from the merged session, the PoC server Y sends a final response to the session merging to the PoC server X, wherein the final response is sent as an OK message. The PoC server X receiving the OK response notifies the PoC client X of the session merge request of the request result through a signaling path of the SIP/IP core based network, wherein the request result is notified as a NOTIFY message (steps S1502 and S1503). Then, the PoC server X receives an OK response to the notification (steps S1504 and S1505) to complete the session merging procedure, and proceeds to a procedure (step S1600) of managing Talk Burst.

The embodiment for the session merging which has been described with reference to FIG. 8 may be variously modified without departing from the basic spirit of the present invention.

As one modification, a user requesting the session merging may become the member or manager of the general PoC session as in FIG. 8. For the sake of policy, when the PoC server requests the session merging, the session manager may request the session merging.

When the user requesting the session merging is the session manager, the PF function of the PoC server of the user is the same as the CF function of the PoC server. As such, the procedures (steps S1100, S1101, S1102 and S1103) of performing the PF function of the PoC server of FIG. 8 may be omitted.

As another modification, when the PoC server of the merged session receives the INVITE message for the session merging, the session merging may be determined at the CF of the PoC server, or after merging authorization is granted to all the members within the merged session, according to group internal policy. In either case, after the corresponding procedure is performed, the PoC server Y sends a response to the INVITE message.

And, after receiving the temporal response to the INVITE message (steps S1200 and S1201), the user of the merging session may directly send a SUBSCRIBE message with respect to a result of the merge request (steps S1300 and S1301).

Thus, according to the present invention, when the group communication is performed in the state where one group communication establishes one PoC group session with another PoC group communication in which two or more users participate the previously activated session is used without any change by the session merging of the PoC sessions. As a result, a procedure which should be performed to participate in a new session is simplified.

To be specific, according to the prior art, each PoC user of the merged session sends a BYE message to release the session, and then performs a procedure for participating in the merging session through a new INVITE message. For this reason, some of the media parameters must be set up again. However, according to the present invention, such a session releasing procedure is not required, so that unnecessary signaling, resource consumption and time can be reduced.

Further, when, after sufficient communication within the merged session, the merged session is divided back into the original group sessions again, a simple BYE request is sent from the PoC server of the merged session to a proxy PoC server, and thereby the merged session can be restored to the respective original PoC sessions.

As set forth above, according to the present invention, because the existing session is not released in order to participate in a new session, signaling and resource allocating processes for the new PoC group session are not required, and the user is not required to release the existing session. As a result, unnecessary operations can be omitted, and thus a time for session establishment can be saved.

Although exemplary embodiments of the present invention have been described, it will be understood by those skilled in the art that the present invention is not limited to the described exemplary embodiments. Rather, various changes and modifications can be made within the spirit and scope of the present invention, as defined by the following claims.

What is claimed is:

1. A method for merging sessions in an Internet Protocol (IP) network, the method comprising steps of:
   requesting, by an IP messaging client, an IP messaging server to merge with another session;
   sending, by the IP messaging sewer, a session merge request message to an IP messaging server of the other session and performing negotiation for session merging; and
   performing the session merging.

2. The method of claim 1, wherein the session merge request message includes at least one of a session merging indication, a media parameter, a session identity, and a contact address of the merging session.

3. The method of claim 1, wherein the session merge request message includes a group identity of the IP messaging client.

4. The method of claim 3, wherein the group identity is a group uniform resource identifier (URI).

5. The method of claim 1, wherein the step of performing the session merging includes determining whether to perform a Controlling Function (CF) after the session of the IP messaging client performs the session merging with any one of the IP messaging server and the IP messaging server of the other session.

6. The method of claim 1, wherein in the step of performing the session merging, the negotiation is performed only by the IP messaging server of the other session.

7. The method of claim 1, wherein in the step of performing the session merging, the negotiation is performed by determining responses of clients of the other session.

8. The method of claim 1, wherein the step of performing the session merging includes sending, by the IP messaging server of the merged session, a response message to the IP messaging server of the merging session.

9. The method of claim 5, further comprising sending information on the IP messaging sewer determined as the CF to the clients of the merging session.

10. The method of claim 9, wherein the step of sending the information on the IP messaging sewer further includes sending, by the CF, information modified after the session merging, to the clients of the merging session.

11. The method of claim 1, further comprising sending session information of the IP messaging client before the IP messaging client requests the IP messaging sewer for the session merging with the other session.

12. The method of claim 11, wherein the session information is sent as an instant message.

13. A push-to-talk over cellular (PoC) network system, comprising:
    at least one PoC client for requesting session merging;
    a PoC server for sending a session merge request message;
    a PoC server of another session for receiving the session merge request message from the PoC sewer, performing negotiation for the session merging, and determining a sewer intended to perform a Controlling PoC Function (CF) with the PoC sewer.

14. The PoC network system of claim 13, wherein the session merge request message includes at least one of a session merging indication, a media parameter, a session identity, and a contact address of the merging session.

15. The PoC network system of claim 13, wherein the session merge request message further includes a group identity of the PoC client.

16. The PoC network system of claim 15, wherein the group identity is a group uniform resource identifier (URI).

17. The PoC network system of claim 13, wherein the negotiation is performed only by the PoC sewer of the other session.

18. The PoC network system of claim 13, wherein the negotiation is performed by determining responses of clients of the other session.

19. The PoC network system of claim 13, wherein the PoC sewer of the other session sends a response message to the PoC sewer of the PoC client session.

20. The PoC network system of claim 13, wherein the PoC sewer determined as the CF sends the sewer information to the client of the merging session.

21. The PoC network system of claim 13, wherein the CF sends information modified after the session merging to the clients of the session.

22. The PoC network system of claim 13, wherein the PoC server of the PoC client session sends information of the PoC client session before requesting the session merging with the other session.

23. The PoC network system of claim 22, wherein the session information is sent as an instant message.

24. The method of claim 1, wherein the IP messaging client is a Push-to-talk Over Cellular (PoC) client and the IP messaging server is a PoC server.

25. A method for merging sessions in clients, comprising:
    generating, at a first client, a message including group identification information of the first client and sending the message to a second client connected to a second sewer via a first server connected to the first client;
    generating, at the second client, a session merge request message using group identification information included in a message sent from the second server, and sending the session merge request message to the first sewer connected to the second client; and
    receiving, at the second client, a message on session merging from the second server connected to the second client, and sending and receiving a message by merging sessions with the first client through the second server based on the received message.

26. A method for merging sessions in a server, comprising:
    receiving, at a first server subjected to session merging, a message from at least one client belonging to the first server, the message including group identification information of the client;
    sending, at the first server, the received message to a second server on which session merging is to be performed;
    sending, at the second server, the message received from the first server to a client connected to the second server;
    receiving, at the second server, a session merge request message from the client connected to the second server;

sending, at the second server, the session merge request message to the first server using the group identification information of the client belonging to the first server; and proceeding communication through the client belonging to the first server and the second server when an approval message for a Controlling PoC Function (CF) is received from the first server in response to the session merge request message.

27. The method of claim 26, wherein the second server performs an operation of the first server.

* * * * *